US010431849B2

(12) United States Patent
Yersak et al.

(10) Patent No.: US 10,431,849 B2
(45) Date of Patent: Oct. 1, 2019

(54) HIGH ENERGY DENSITY ALKALI METAL BATTERIES INCORPORATING SOLID ELECTROLYTES

(71) Applicant: GM GLOBAL TECHNOLOGY OPERATIONS LLC, Detroit, MI (US)

(72) Inventors: Thomas A. Yersak, Ferndale, MI (US); James R. Salvador, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 127 days.

(21) Appl. No.: 15/493,496

(22) Filed: Apr. 21, 2017

(65) Prior Publication Data
US 2018/0309165 A1  Oct. 25, 2018

(51) Int. Cl.
| | | |
|---|---|---|
| *H01M 10/05* | (2010.01) | |
| *H01M 10/0562* | (2010.01) | |
| *H01M 10/0525* | (2010.01) | |
| *H01M 10/058* | (2010.01) | |
| *H01M 10/052* | (2010.01) | |
| *H01M 10/054* | (2010.01) | |

(52) U.S. Cl.
CPC ..... *H01M 10/0562* (2013.01); *H01M 10/052* (2013.01); *H01M 10/054* (2013.01); *H01M 10/058* (2013.01); *H01M 10/0525* (2013.01); *H01M 2220/20* (2013.01); *H01M 2220/30* (2013.01); *H01M 2300/0068* (2013.01)

(58) Field of Classification Search
None
See application file for complete search history.

(56) References Cited

U.S. PATENT DOCUMENTS

| | | | | |
|---|---|---|---|---|
| 2011/0287292 | A1* | 11/2011 | Suyama | H01M 2/145 429/94 |
| 2014/0321030 | A1* | 10/2014 | Tsurumi | H01G 11/54 361/525 |
| 2016/0141115 | A1* | 5/2016 | Yokomizo | H01G 11/46 361/525 |
| 2017/0092981 | A1* | 3/2017 | Anandan | H01M 4/0407 |

OTHER PUBLICATIONS

U.S. Appl. No. 15/494,745, filed Apr. 24, 2017; Thomas A. Yersak, et al.
U.S. Appl. No. 15/480,505, filed Apr. 6, 2017; Thomas A. Yersak, et al.

* cited by examiner

*Primary Examiner* — Scott J. Chmielecki
(74) *Attorney, Agent, or Firm* — Reising Ethington P.C.

(57) ABSTRACT

An electrochemical cell comprising an alkali metal anode and a solid electrolyte is disclosed. The surface of the electrolyte is roughened, mechanically, chemically or by ablation and the cell is operated at a pressure of between 3 MPa and 10 MPa. Such a cell exhibits higher power density than a like-dimensioned cell employing a smooth-surfaced electrolyte surface and operated at pressures of less than 1 MPa.

14 Claims, 3 Drawing Sheets

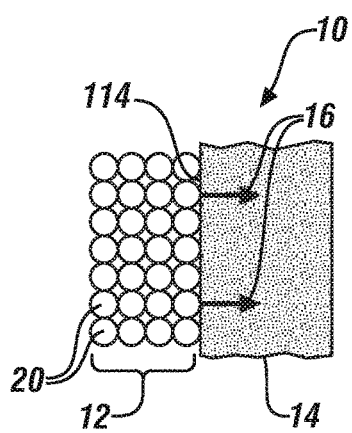
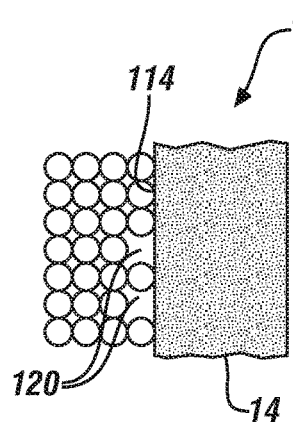
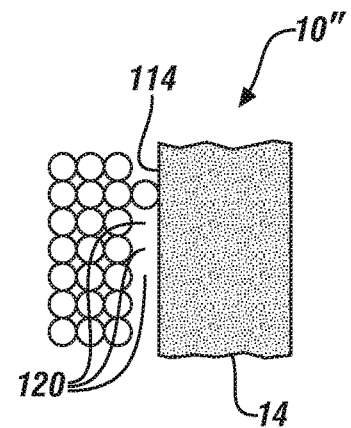
FIG. 1A    FIG. 1B    FIG. 1C
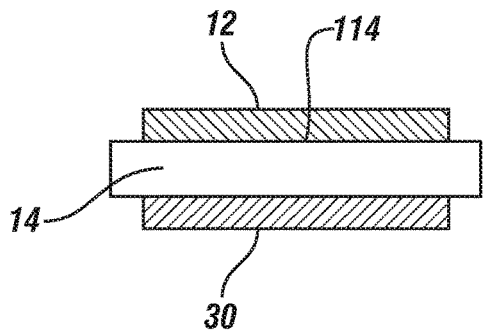
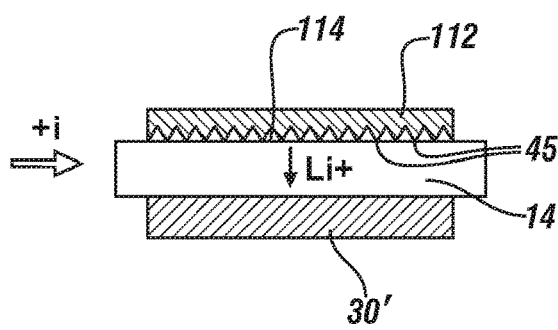
FIG. 2A    FIG. 2B
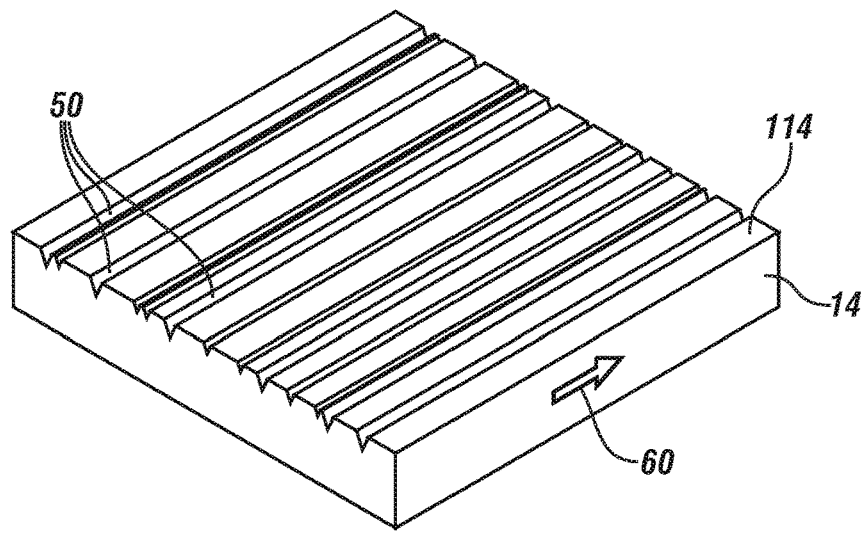
FIG. 3

HIGH ENERGY DENSITY ALKALI METAL BATTERIES INCORPORATING SOLID ELECTROLYTES

TECHNICAL FIELD

Methods are provided for preparing high output, long life batteries which employ an alkali metal, particularly lithium or sodium, as the anode and a solid electrolyte.

INTRODUCTION

Batteries based on a lithium chemistry are increasingly dominant in applications requiring high energy density such as automotive vehicles and many other consumer products such as phones and cameras. Most lithium chemistry batteries in current use intercalate lithium into a suitable receptor/donor material capable of receiving and accepting lithium ions during battery charge and discharge cycles. The electrodes are then spaced apart, and separated by, a porous polymeric film separator, and immersed in an organic, lithium ion-conducting liquid electrolyte. In addition to high energy densities, such lithium ion batteries lose a minimal amount of charge when not in use, and do not exhibit memory effects.

But the energy density of existing rechargeable batteries may be further improved through the use of metallic lithium electrodes. However, lithium metal may react with and consume the liquid electrolytes commonly-used in lithium ion batteries, resulting in a progressive reduction in cell capacity over multiple charge discharge cycles. This lithium reactivity has led to the development of solid state electrolytes which both conduct lithium ions and serve to physically and electrically isolate the anode and cathode.

But, such lithium batteries, while potentially offering higher energy density than lithium-ion batteries, may also often exhibit a progressive reduction in energy density after repeated charge-discharge cycles. In many cases the reduction in energy density may be sufficient to negate their initial advantage over lithium-ion batteries.

There is thus a need to improve the long-term power density of particularly lithium metal batteries and alkali metal batteries generally.

SUMMARY

This disclosure relates to aspects of improving the long-term energy density of rechargeable secondary batteries which employ an alkali metal, for example lithium or sodium, as an electrode and a solid electrolyte both as an ionic conductor and a separator. The methods may be employed separately but superior results are achieved by employing the methods in combination.

In a first aspect, a surface of the solid electrolyte is roughened by any suitable means including, but not limited to, mechanical abrasion, laser ablation and chemical etching, to render a larger effective surface area on the electrolyte than is achievable with a smooth planar surface. The degree or severity of the roughening is informed both by the improvement in energy density and the propensity of the solid electrolyte, most of which are glassy or ceramic, to fracture under mechanical loading.

In a second aspect, the alkali metal electrode material is impressed under pressure against the surface of the solid electrolyte. The applied impressed pressure causes the alkali metal to flow extensively and substantially fully fill the depressions in the roughened solid electrolyte surface so that the electrode engages substantially the entirety of the larger effective surface area. The initial impressing pressure is maintained when the battery is in service and serves both to assure continuity of electrical contact between the alkali metal electrode material and the solid electrode during discharge.

A high capacity, alkali metal anode, electrochemical cell, embodying the above characteristics may be fabricated by assembling, under a pressure greater than the flow stress of the alkali metal anode, the alkali metal anode and a roughened solid electrolyte.

The practices cited above are broadly applicable to a range of solid electrolyte families including, without limitation; sulfide, oxide and oxysulfide glasses, glass-ceramics, and ceramics; garnets; anti-perovskites; perovskites; and, materials with a structure analogous to the NASICON (sodium (NA) SuperIonic CONductor) structure, of which LATP ($Li_{1.3}Al_{0.3}Ti_{1.7}(PO_4)_3$ is a non-limiting example.

BRIEF DESCRIPTION OF THE DRAWINGS

FIGS. 1A, B, C schematically illustrate, in fragmentary view, a portion of the anode and solid electrolyte in a metal anode battery. Particularly the figures show how the arrangement of atoms in the metallic anode changes as an as-manufactured battery (FIG. 1A) is first discharged leading to partial loss of electrode contact (FIG. 1B) and then substantially full loss of electrode contact (FIG. 1C).

FIGS. 2A, B schematically illustrate the reduction in the electrode contact area of a metallic anode battery after repeated discharge and charge cycles.

FIG. 3 schematically illustrates, in quasi-perspective view, the surface of a solid electrolyte mechanically roughened by linear motion of an abrasive body in contact with the surface.

FIG. 4A shows the behavior of a cell fabricated conventionally, while

DESCRIPTION OF PREFERRED EMBODIMENTS

Figures 4A, 4B:
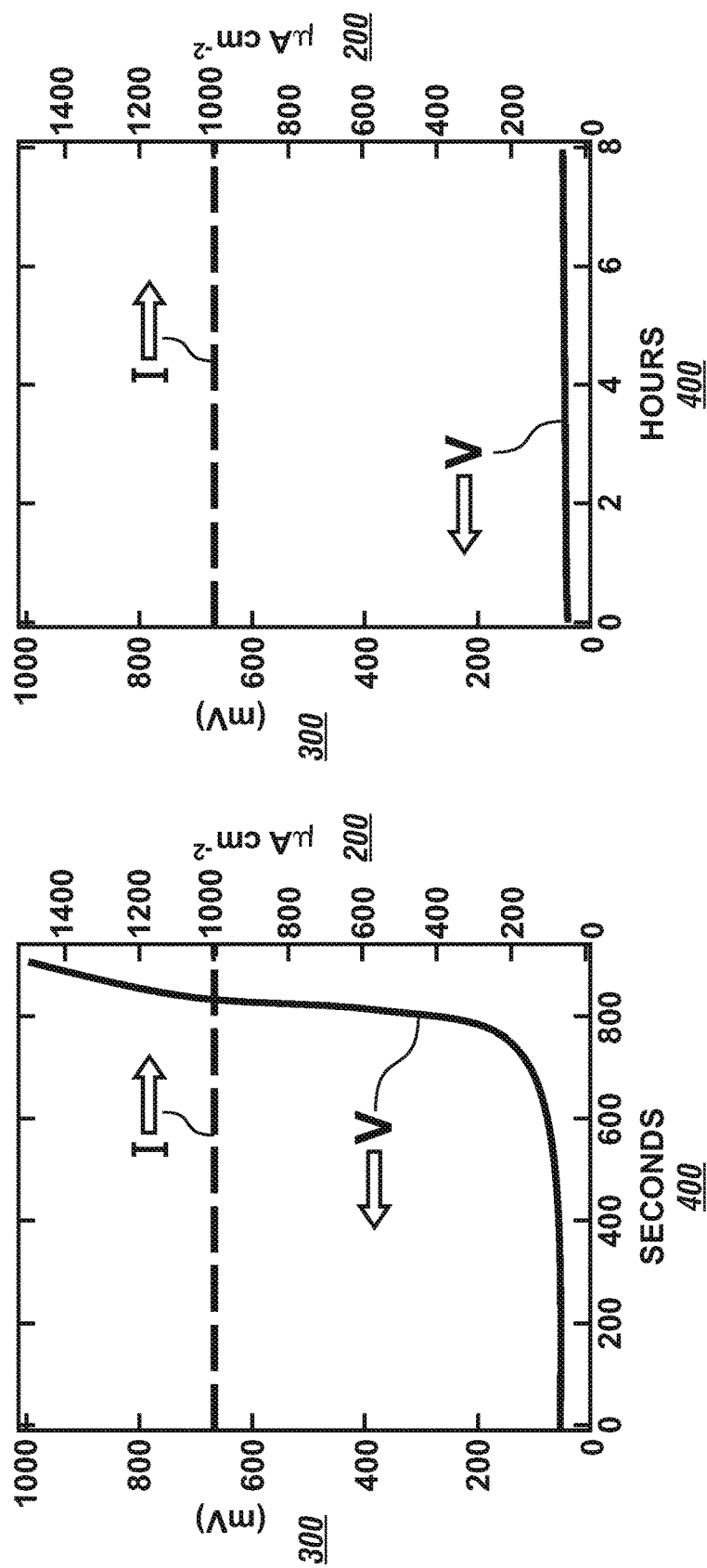
FIGS. 4A, B compare the discharge performance of two Li—Li cells.
FIG. 4B shows the behavior of a cell fabricated according to the methods of this disclosure.

Batteries employing cells which employ alkali metal anodes, commonly lithium and sodium, have great potential in applications where high energy density batteries offer performance improvements. Such applications may include, for example, transportation applications such as in electric or hybrid automobiles and trucks, and consumer electronics applications such as in computers and phones.

Lithium-ion batteries commonly employ liquid electrolytes, but the electrolytes in common use in lithium-ion batteries slowly react with lithium metal. Thus, lithium batteries which employ liquid electrolytes lose capacity over relatively few charge discharge cycles. For this reason, lithium anode batteries, and alkali metal anode batteries generally, typically employ solid electrolytes. Such solid electrolytes may also serve as a separator, maintaining electrical isolation between the cell anode and cathode and inhibiting dendritic shorting of cell and preventing overheating or thermal runaway of the cell. However, a metal anode battery employing a solid electrolyte is susceptible to early failure due to contact failure.

In a Li battery with a solid phase electrolyte, an interface is made between the solid Li metal and the solid phase electrolyte. The solid phase electrolyte may be a sulfide or oxysulfide glass, or a glass-ceramic among others. Because a solid phase electrolyte promotes coulombic efficiency approaching unity, the battery does not lose capacity over time. However, the solid-solid interfacial contact is prone to contact failure, wherein enough Li is stripped from the interface during discharge that the Li metal electrode loses electrical contact with the solid phase electrolyte over a large portion of the electrolyte area leading to a rapid increase in internal resistance, followed by cell failure due to the resulting high local current densities.

Because of such loss of contact, conventionally-processed metal anode batteries are limited to a capacity of approximately 200 $\mu Ah\, cm^{-2}$ (microampere-hours per square centimeter). Such a capacity is adequate for the thin film 'button cell' batteries often used as embedded power sources in some consumer electronics. However, this capacity, 200 $\mu Ah\, cm^{-2}$, is significantly less than the capacity of 1000 $\mu Ah\, cm^{-2}$, or greater, required for lithium metal anode batteries to supplant lithium-ion batteries in high current, high capacity batteries in, for example, hybrid or battery vehicle applications, or for battery-powered hand tools or garden tools such as drills, saws, weedwhackers, and mowers, among others.

The stripping of metal anode atoms from the anode-solid electrolyte interface is shown schematically at FIGS. 1A-C. FIG. 1A shows, in fragmentary view, a portion of an as-manufactured, metal anode battery 10. Metal anode 12 is composed of a plurality of metal atoms 20, simplistically depicted as circles in the figure, and shown in a crystalline atomic arrangement with the innermost layer of atoms contacting a solid state electrolyte 14 (atomic detail not shown). Most alkali metals adopt a body-centered cubic structure at room temperature or about 25° C., so the atomic arrangement shown may be representative of a {100} plane.

In the following discussion, battery 10 is assumed, for example only, and without limitation, to be a lithium battery so that metal atoms 20 which comprise metal anode 12 are lithium atoms in a lithium anode. On discharge, some of the initial lithium atoms 20 are oxidized, releasing electrons to an external circuit (not shown) and producing lithium ions which are transported through solid state electrolyte 14 to a suitable cathode (not shown). The passage of lithium ions through solid state electrolyte 14 is represented as ion flow 16. Because the oxidation of lithium atoms 20 is not uniform on the smooth surface 114 of the solid electrolyte, continued operation or discharge of battery 10 will, as shown at FIG. 1B, produce a battery 10' with local vacancies 120 at smooth, solid state electrolyte surface 114, where lithium atoms are not present. On continued discharge, the electrolyte area occupied by vacancies continues to increase until extensive numbers of individual vacancies aggregate into macroscopic voids resulting in an almost complete loss of electrical contact in some areas of the electrolyte 14 as shown at FIG. 1C. While there may be other regions of the solid electrolyte surface where contact with lithium ions is maintained, the local current density at such locations will increase dramatically, and, on continued discharge, promote battery failure.

Thus, the continuing loss of electrode/electrolyte contact area determines the capacity of the battery and not the total volume or mass of lithium metal in the electrode. If battery discharge is terminated prior to battery failure, the battery may be recharged to substantially its original capacity as the voids will be filled during cell charging. However, deposition of lithium atoms can only occur in regions where electrode/electrolyte electrical contact is maintained. So, lithium deposition will not be uniform across the electrolyte area but rather will, initially at least, occur in local regions where electrode/electrolyte contact is maintained leading to the generation of locally high stresses which negatively impacts battery life.

In the previous discussion, solid electrolyte 14 was characterized as having a 'smooth' surface 114. The term 'smooth' is generally intended to differentiate between an as-manufactured surface, and, as is discussed below, a surface which has been artificially and deliberately roughened. Two categories of solid electrolytes may be employed, solid electrolytes prepared from powder processed or powder-consolidated films, typically by sintering the powder, and melt processed film prepared from a liquid melt. Typically, the melt processed films have at least some glassy or amorphous character while the powder process films are typically ceramic in character. For glasses in general, including the melt processed glassy solid electrolytes, a typical as-manufactured RMS (Root Mean Square) surface roughness range is from 0.001-0.1 micrometers while an as-manufactured, sintered ceramic film may have a roughness ranging from about 0.5 micrometers to 1 micrometer. In general, the term 'roughened' applied to a solid electrolyte surface will refer to a solid electrolyte surface which has been artificially roughened. In the case of a melt processed glassy film, the roughened surface may have an RMS roughness ranging from 0.5 micrometers to 10 micrometers, while for a powder processed film the roughened surface the RMS roughness may range from between 2 and 10 micrometers.

A later stage of this process is shown, schematically, at FIG. 2A, which shows an as-manufactured cell with a metallic anode 12, a cathode 30, and an intervening solid state electrolyte 14. A suitable cathode may, without limitation, be fabricated of NMC, a mixed oxide formulation with the general composition Li [$Ni_y$, $Co_{(1-2y)}Mn_y$]$O_2$. In service, lithium is intercalated into NMC during discharge and de-intercalated from NMC during a subsequent charging operation. This macroscopic representation is analogous to the atom-level structure shown in FIG. 1A. The same cell is shown, at FIG. 2B, in a substantially discharged state after having undergone a discharge cycle, generally indicated by the arrow labelled as +i and showing transport of lithium ions (Li+) through solid electrolyte 14. The cell now, at FIG. 2B, comprises a metallic anode 112 with a roughened or 'corrugated' surface in contact with smooth, solid state electrolyte surface 114 and an appreciably thicker cathode 30'. As shown at FIG. 2B, the arrangement of remaining contact locations between the partially oxidized anode 112 and electrolyte surface 114 is shown as a series of regularly-spaced contact points 45, but this for graphical convenience only. The arrangement of contact locations may adopt any configuration, regular or irregular, depending on, without limitation, the cell chemistry, the initial anode geometry, the discharge rate, the cell temperature or other parameters which may influence anode oxidation.

In the configuration shown at FIG. 2B, contact between anode 112 and solid state electrolyte 14 is made through a plurality of substantially discrete contacts 45, rather than across the entirety of the smooth, solid electrolyte surface 114 as shown for the cell in its as-manufactured state as shown at FIG. 2A. The extent of such reduction in contact may be significant. As an example, a lithium anode cell with a smooth solid electrolyte tested under a current draw of 1000 $\mu Acm^{-2}$ (microamperes per square centimeter) showed a reduction in apparent electrode area of a factor of 4 after the oxidation of approximately 200 μAh cm$^{-2}$ of lithium, i.e. the apparent anode area was 25% of the nominal anode area, resulting from localization of lithium oxidation. The appreciable reduction in the current-carrying portion of the anode results in local current densities which exceed the nominal current density by a factor of 4 or more. This, in turn, promotes yet further localization of lithium oxidation and generates local stresses during the subsequent charging cycle. These local stresses may be sufficient to fracture the solid electrolyte and lead to internal electrical short circuiting within the cell.

In an aspect, it has been determined that increasing the effective surface area of the solid electrolyte in face-to-face contact with the alkali metal anode is effective in increasing the durability of metal anode cells. In general, when an alkali metal-intercalating cathode is used, the opposing surface of the solid electrolyte in face-to face contact with the cathode may be smooth. As a non-limiting illustration of such roughening, FIG. 3 shows, in quasi-perspective view, solid state electrolyte 14 after it has been mechanically roughened on its alkali metal anode-contacting surface 114. Suitably, such mechanical roughening may be performed by bringing an abrasive body (not shown) into contact with previously-smooth surface 114, applying pressure to the abrasive body, and then dragging or pushing the abrasive body in the direction shown by arrow 60. The resulting surface, shown in FIG. 3, comprises portions of remnant smooth surface 114, with linear scratches or grooves 50 oriented parallel to arrow 60. For graphical convenience, the grooves 50 are depicted as V-shaped and extending across the entirety of initial surface 114. But those of skill in the abrasive arts will recognize that the abrasive particles in an abrasive body may wear and break off, to thereby produce alternate groove cross-sections and grooves which extend only part-way across initially smooth surface 114. Suitable abrasive bodies may include bulk, consolidated particles, as in a grinding wheel, or abrasive particles supported by a paper or fabric backing, as in 'sanding paper', or loose abrasives directed, for example by an air stream, at a shallow angle to surface 114. Less directional mechanical roughening may also be achieved by 'sand-blasting' if the abrasive particles are directed at an electrolyte surface at a near-normal angle. Suitable abrasives may include, without limitation, diamond, carbides, carborundum, alumina and silica Many solid state electrolyte compositions have been proposed. These may include, without limitation, sulfide, oxide, and oxysulfide glasses and partially-crystallized, glass-ceramics comprising glass formers such as $P_2S_5$, $SiS_2$, $GeS_2P_2O_5$ and glass modifiers such as $Na_2S$, $Li_2S$; ceramic phases such as $Li_3PS_4$, $Li_7P_3S_{11}$, and $Li_{10}P_2XS_{12}$ (X=Ge, Sn, Si); garnets such as $Li_7La_3Zr_2O_{12}$ (LLZO); anti-perovskites such as $X_3YO$, where X may be Li or Na, and Y may be Cl or Br; perovskites such as $Li_{0.67-x}La_{3x}TiO_3$ (LLTO); and, phosphates such as $Li_{1.3}Al_{0.3}Ti_{1.7}(PO_4)_3$ (LATP) and, materials with a structure analogous to the NASICON (sodium (NA) SuperIonic CONductor) structure, of which LATP ($Li_{1.3}Al_{0.3}Ti_{1.7}(PO_4)_3$) is a non-limiting example.

Although the above discussion has focused on mechanical abrasion for roughening the solid electrolyte surface, other approaches to roughening the surface including acid etching using a suitably protic solvents such as alcohols or organic acids, aggressive acid such as HF, and selective laser ablation using suitably-powered gas, chemical, solid state or fiber lasers, for example, may also be effectively employed. It is expected that the method of roughening adopted will be informed by the character (glass, ceramic or a glass-ceramic) of the solid electrolyte and its composition. The character of the surface will, of course, affect the nature of the surface with etched and laser ablated surfaces comprising overlapping, more equiaxed, depressions than the elongated scratches shown at FIG. 3. All of these methods will be effective in increasing the effective surface area of the solid electrolyte and may be applied individually or in combination.

The degree of roughening is informed by the competing requirements of increasing the electrolyte surface area while recognizing that all of the above possible separator materials have limited ductility and are therefore prone to fracture if overloaded. Fracture is promoted by the presence of flaws, including surface flaws or cracks such as those shown at FIG. 3. The fracture stress of limited ductility materials may be estimated using a fracture mechanics approach. Generally, fracture mechanics predicts that a material will fracture at a stress a which is given by:

$$\sigma = c\sqrt{a}$$

where, C depends on the material and crack geometry and, a is the length of a surface crack Hence, by modelling, experiment or experience it will be necessary to balance the competing requirements of increasing the effective surface area of the electrolyte by roughening the electrolyte surface without so extensively roughening the surface that the ability of the electrolyte to resist in-service loads is unduly reduced. As noted earlier, and by way of example only, and without any limitation, a suitable range of RMS surface roughnesses for a solid electrolyte layer or film may range from 2-10 micrometers for powder processed films or 0.5-10 micrometers for melt processed films where such roughness is measured according the protocol(s) established for measuring the RMS roughness parameter. Since the fracture characteristics of the range of possible solid electrolytes will differ from one another, some compositions may suitably be roughened more aggressively, promoting a greater increase in solid electrolyte surface area, while ensuring that the solid electrolyte remains sufficiently robust to withstand in-service loads without fracturing.

In a further aspect, the metal anode may be assembled to the solid electrolyte under enhanced pressure. Conventional lithium metal anode cells with smooth-surface electrolytes are assembled and operated under a pressure ranging from 0.3 MPa to 0.7 MPa. As shown at FIG. 4A, such a cell, when discharged at a current density of 1000 μAcm$^{-2}$ (curve I, ordinate 200, scaled in μAcm$^{-2}$) may fail, indicated by the rapid increase in cell voltage (curve V, ordinate 300, scaled in millivolts, mV), after about 800 seconds (abscissa 400, scaled in seconds). This corresponds to a cell capacity of about 200 μAh cm$^{-2}$. The cell voltage increased because of the development of a large internal resistance due to near-complete loss of electrical contact between glass and Li metal electrode (such as that shown in FIG. 1C).

The performance of a cell combining a lithium metal anode with a roughened surface electrode, assembled and operated under a pressure of about 10 MPa, is shown at FIG. 4B. The cell whose performance is illustrated in FIG. 4B is thus operated at a pressure more than 10 times that of the cell whose performance is shown in FIG. 4B. Again, the cell is discharged at a current density of 1000 μA cm$^{-2}$ (curve I, ordinate 200, scaled in μA cm$^{-2}$) but, for this cell, the voltage is stable (curve V, ordinate 300, scaled in millivolts, mV) over an 8 hour period (abscissa 400', scaled in hours). This corresponds to a cell capacity of about 8000 μAh cm$^{-2}$ or, 40 times the capacity of the cell whose performance is shown in FIG. 4A. It will be appreciated that a cell with a roughened electrode operated under higher pressure offers significant improvements in useful life.

One useful parameter for characterizing the properties of an electrochemical cell is the critical current density, or CCD, broadly defined as 'the amount of current per unit area of electrode at which an abrupt change occurs in a variable of an electrolytic process'. In general, modestly roughening the electrolyte surface, such as may be achieved using 1200 grit abrasive paper applied with manual pressure of between about 5 N and 20 N or so, will, in combination with an increase in cell operating pressure to about 10 MPa, result in a cell which exhibits at least a 25% increase in CCD over a like-dimensioned cell with a smooth electrolyte surface operated at a pressure ranging from 0.3 MPa to 0.7 MPa.

Without wishing to be bound by any particular theory, it appears that the operating pressure of about 10 MPa of the above test cell is greater than the room temperature, or about 25° C., flow stress of lithium metal of between about 0.85 MPa and 1 MPa. It may therefore be that the higher applied pressure promotes mechanical deformation of the lithium metal anode and so impresses fresh electrode material into any voids formed at the electrode-electrolyte interface thereby at least partially restoring electrode-electrolyte electrical and mechanical contact while in use. This suggests that a maximum benefit of increasing pressure is obtained when the pressure exceeds the electrode metal flow stress and that minimal further benefit will result from yet further increases in operating pressure. Thus, it appears that the pressure employed in the above example, about 10 MPa, may be reduced to about 3 MPa without losing the benefits of such enhanced pressure operation. It should, however, be noted, that a higher overpressure may be required for the narrow, steep-sided, slot-like abrasions shown at FIG. 3 than are necessary for the less steep-sided depressions resulting from laser ablation or chemical etching. Similar considerations may also be applicable to sodium metal electrodes, but, it may be noted that sodium is believed to have a lower flow stress than lithium so that cells with sodium metal electrodes may offer superior performance when operated at yet lower pressures than are appropriate for lithium metal electrode cells.

In a first aspect, such higher-pressure cells may be fabricated and assembled into a battery contained within a deformable casing such as a pouch or thin-walled container and maintained under pressure using an external pressure source. Alternatively, in a second aspect, the cells may be assembled into a battery contained within a rigid, robust container and subjected to the desired pressure during fabrication. A sufficiently robust container will continue to sustainably apply the required pressure as lithium atoms are reversibly transferred from the anode to the counter electrode (cathode).

Figure 5:
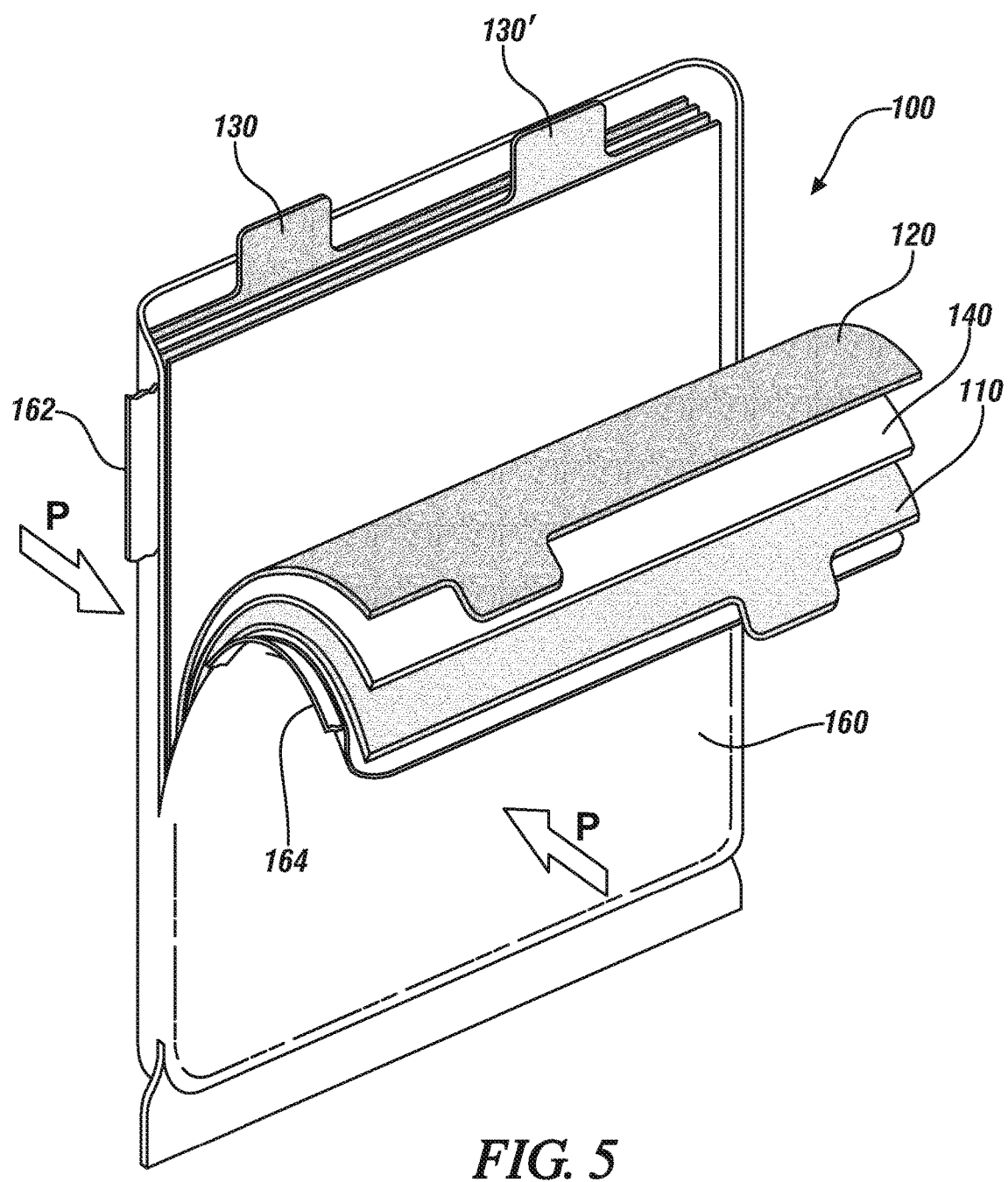
FIG. 5 shows, in partial cutaway, a representative prismatic cell which may incorporate a roughened solid electrolyte and operate under elevated pressure.

A representative arrangement, applicable to both aspects is illustrated at FIG. 5, which shows, in partial cutaway a prismatic cell 100 comprising a tabbed alkali metal anode 110, a solid electrolyte 140 and a tabbed cathode 120 arranged in interlayers. Connection of the battery to an external circuit may be made through tabs 130 (cathode) and 130' (anode). Case 160 may be a soft pouch or a robust solid casing. If case 160 is a soft pouch then pressure P may be applied by an external source, for example, hydraulically. If case 160 is a robust casing, then the various interlayers may be subjected to a pressure P during battery assembly and the pressure maintained by inserting the battery assembly, under pressure, into tightly-fitting casing 160. For example, and without limitation, casing 160 may be composed of two parts which serve to transmit pressure P to the battery assembly. After full pressure is attained, the parts may then be secured together, for example at flanges 162 and 164 (shown in fragmentary view only), to form casing 160, while pressure P is maintained at between 3 MPa and 10 MPa. Selection of the metal anode, lithium or sodium metal, may inform the selection of the appropriate cathode material. As an example only, and without limitation, cathode 120 may comprise mixed oxide composition Li [$Ni_y$, $Co_{(1-2y)}$$Mn_y$]$O_2$ (NMC). Anode 110 may be a metallic anode consisting of lithium metal or sodium metal and any commonly-occurring impurities. The alkali metal of the anode may be applied mechanically, by thermal evaporation, or may be electrochemically deposited after battery assembly. Such electrochemical deposition may be accomplished by charging the cathode with $LiMO_2$ (where M may be Mn, Co or Ni) then electrochemically plating Li on a copper current collector by oxidizing $LiMO_2$ to $Li_{1-x}MO_2$.

It will be appreciated that the solid electrolytes which have been described will exhibit limited ductility and may, in some compositions, be brittle. Such solid electrolytes are not well suited to spiral-wound or race-track wound battery geometries, particularly since an appreciable tensile load must be applied to the wound layers during battery fabrication to apply the intended pressure to the alkali metal anode. However, where a solid electrolyte composition may be capable of sustaining these loads during fabrication without damage or prejudice to its intended purpose, wound battery geometries may also be employed.

The above description of exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. An electrochemical cell comprising an alkali metal anode layer of one of lithium or sodium, a solid electrolyte layer, and a cathode layer, the solid electrolyte layer comprising:

a glass, ceramic, or glass-ceramic, solid electrolyte layer with opposing surfaces, one of the surfaces being roughened to increase its effective surface area for increased direct physical contact with the alkali metal anode layer, the roughened surface being maintained in electrical and mechanical face-to-face contact with the alkali metal anode layer and the opposing surface being maintained in electrical and mechanical face-to-face contact with the cathode layer in the operation of the electrochemical cell by an applied pressure, the applied pressure being sufficient to cause the alkali metal anode layer material to flow into contact with the roughened surface of the solid electrolyte layer and to enable an increase in critical current density of at least 25% over a like dimensioned cell with a solid electrolyte with an un-roughened surface.

2. The electrochemical cell recited in claim 1 in which the one solid electrolyte surface is roughened by one or more of, mechanical abrasion, chemical etching and laser ablation.

3. The electrochemical cell of claim 1 in which the cell is operated at a pressure greater than the flow stress of the lithium or sodium metal anode.

4. The electrochemical cell of claim 1 in which the cell is operated at a pressure of between 3 MPa and 10 MPa.

5. The electrochemical cell of claim 1 in which the RMS roughness of the roughened surface of the solid electrolyte ranges from 2 micrometers to 10 micrometers for a powder processed film electrolyte or from 0.5 micrometers to 10 micrometers for a melt processed film electrolyte and is selected to not prejudice the ability of the cell to accommodate in-service loads without fracturing the solid electrolyte.

6. The electrochemical cell of claim 1 in which the solid electrolyte is one of sulfide, oxide, and oxysulfide glasses and glass-ceramics, garnets, anti-perovskites, perovskites and, $Li_{1.3}Al_{0.3}Ti_{1.7}(PO_4)_3$.

7. The electrochemical cell of claim 1 in which the solid electrolyte is a sulfide or an oxysulfide glass or a sulfide or oxysulfide glass-ceramic.

8. An electrochemical cell comprising a lithium metal anode layer, a solid electrolyte layer, and a cathode layer, the solid electrolyte layer comprising:

a glass, ceramic, or glass-ceramic, solid electrolyte layer with opposing surfaces, one of the surfaces being roughened to increase its effective surface area, the roughened surface being maintained in face-to-face electrical and mechanical contact with the lithium metal anode layer and the opposing surface being maintained in electrical and mechanical face-to-face contact with the cathode layer in the operation of the electrochemical cell by an applied pressure of between 3 MPa and 10 MPa, the applied pressure being sufficient to cause the lithium metal anode layer material to flow into contact with the roughened surface of the solid electrolyte layer and to enable an increase in critical current density of at least 25% over a like dimensioned cell with a solid electrolyte with an unroughened surface.

9. The electrochemical cell of claim 8 in which the solid electrolyte is a sulfide or an oxysulfide glass or a sulfide or oxysulfide glass-ceramic.

10. The electrochemical cell of claim 8 in which the one surface of the solid electrolyte is roughened by a mechanical abrasive.

11. The electrochemical cell of claim 10 in which the RMS roughness of the roughened solid electrolyte layer surface ranges from 2 micrometers to 10 micrometers for a powder processed film electrolyte or from 0.5 micrometers to 10 micrometers for a melt processed film electrolyte.

12. The electrochemical cell of claim 8 which has a capacity of about 8000 $\mu Ah\ cm^{-2}$ when discharged at a current density of 1000 $\mu A\ cm^{-2}$.

13. The electrochemical cell of claim 8 in which the pressure is maintained by a rigid container.

14. The electrochemical cell of claim 8 in which pressure is maintained by an external pressure source.

* * * * *